United States Patent [19]

Russell

[11] 4,251,601

[45] Feb. 17, 1981

[54] FUEL-DISSOCIATION ELECTRICAL CURRENT GENERATING APPARATUS AND METHOD

[75] Inventor: Sid Russell, Suffield, Conn.

[73] Assignee: United Technologies Corporation, Hartford, Conn.

[21] Appl. No.: 970,780

[22] Filed: Dec. 18, 1978

[51] Int. Cl.² .............................................. H01M 8/04
[52] U.S. Cl. ...................................... 429/17; 429/20; 429/51
[58] Field of Search ............................ 429/17, 13-16, 429/20, 50, 51

[56] References Cited

U.S. PATENT DOCUMENTS

| | | | |
|---|---|---|---|
| 3,150,657 | 9/1964 | Shultz et al. | 429/20 X |
| 3,532,547 | 10/1970 | Vahldieck et al. | 429/17 |
| 3,657,015 | 4/1972 | Veatch et al. | 136/83 R |
| 3,730,774 | 5/1973 | McKee et al. | 429/17 |
| 3,970,588 | 7/1976 | Taylor et al. | 252/459 |
| 4,027,476 | 6/1977 | Schmidt | 60/218 |
| 4,128,700 | 12/1978 | Seduquist | 429/17 |

*Primary Examiner*—Charles F. LeFevour
*Attorney, Agent, or Firm*—Harry J. Gwinnell

[57] ABSTRACT

The disclosure is directed to a method of generating electrical current in a controlled fashion from ionically conductive fuels such as hydrazine based fuels by bringing the fuel up to its dissociation temperature between two electrodes of dissimilar material which are initially thermally energized by dissociating the fuel by contact with a decomposition catalyst. The electrical current produced is extracted from the system by means of electrical leads connected to the electrodes. Apparatus comprising a fuel source conduit, a porous membrane for dispersing the fuel, metal screen electrodes, and a fuel decomposition catalyst are also described.

27 Claims, 3 Drawing Figures

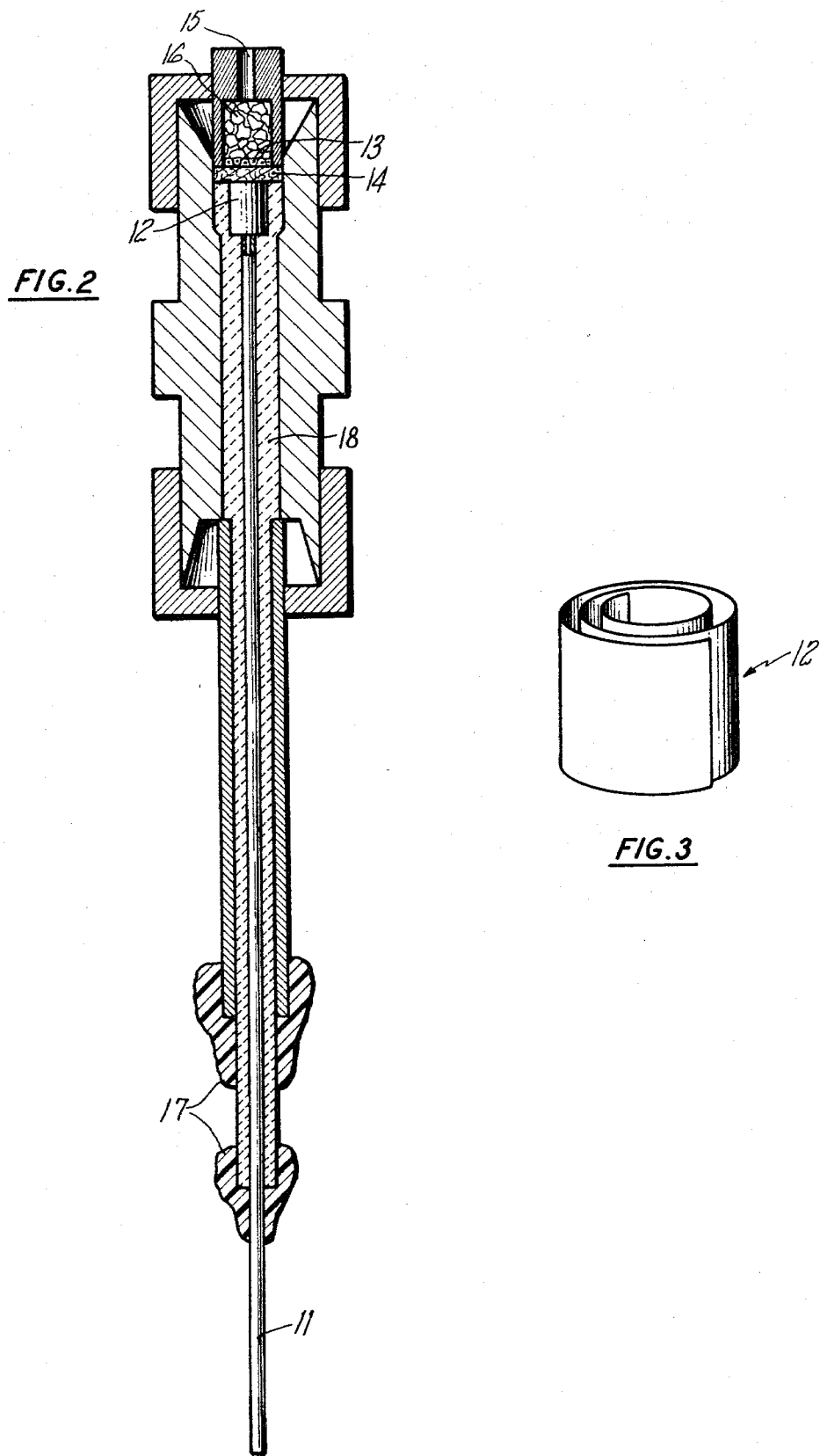

FUEL-DISSOCIATION ELECTRICAL CURRENT GENERATING APPARATUS AND METHOD

BACKGROUND OF THE INVENTION

1. Field of Art

The field of art to which the invention pertains is electrical current producing apparatus and process including generation of the reactant.

2. Description of the Prior Art

Hydrazine based fuel sources have been well known in the prior art as a source of energy. However, this source has generally been limited to the use of such energy to provide gas thrust in a mono-propellant rocket thruster environment. In this regard, note U.S. Pat. No. 3,970,588 which teaches the use of hydrazine decomposed on a catalyst for use in a mono-propellant rocket thruster; U.S. Pat. No. 4,027,476 which teaches a porous material containing a catalyst which can be used in mono-propellant rocket reactors; and United Aircraft Laboratory Report AFRPL-TR-72-26 which teaches the electrolytic decomposition of hydrazine-hydrazine azide mono-propellants for use in an electrolytic ignition system for a millipound thruster. Other uses of hydrazine based fuels in connection with electrical current producing apparatus are U.S. Pat. No. 3,657,015 which teaches the use of a hydrazine based fuel to generate electrical energy in a fuel cell, and United Technologies Report R-76-911319 which teaches the electrochemical properties of hydrazine-hydrazine azide solutions. Also, U.S. Pat. No. 3,861,137 describes apparatus useful with hydrazine-hydrazine azide mono-propellants in an electrolytic ignition system for a millipound thruster.

However, as evidenced by the above, there has been little if any recognition of the potential of ionically conductive fuels such as hydrazine based fuel sources in electrical current generation. Some of the reasons for the lack of appreciation of this potentially great electrical energy generation source may be the fact that at ambient temperatures potential differences produced from these fuels have been but a few tenths of a volt. Also, control of the dissociation rate of ionically conductive fuels such as hydrazine-based fuels at high temperatures could present a problem.

BRIEF SUMMARY OF THE INVENTION

Accordingly, the present invention is directed to a method and apparatus for generating electrical current in controlled fashion and usable amounts from ionically conductive fuels such as hydrazine based fuels. The apparatus comprises a fuel source conduit leading to a porous, electrically non-conductive membrane which is in contact with two electrodes of dissimilar metals. Electrically conductive leads extend from each of the electrodes and the entire apparatus is enclosed in an insulated case having gas vents for exhausting fuel-decomposition products. In operation, electrical current is generated by passing an ionically conducting fuel such as hydrazine based fuel through the conduit leading to the porous membrane. The membrane disperses the fuel in the vicinity of the electrodes where fuel decomposition is initiated by contact with a fuel decomposition type catalyst. The catalytically induced decomposition of the fuel provides heat energy to heat the fluid permeable electrodes causing subsequent fuel dissociation to occur directly on the heated electrodes. The dissociation is sustained on the electrodes by a thermal bootstrapping action. A different fuel dissociation reaction is enforced at each electrode (note the equations infra) by virtue of the dissimilar electrode materials leading to the generation of an electrical current. Liquid fuel is maintained between the electrodes for ionic transport by regulating the fuel feed rate and internal pressure in the apparatus.

The foregoing and other objects, features and advantages of the present invention will become more apparent in light of the following detailed description of preferred embodiments thereof as discussed and illustrated in the accompanying drawings.

BRIEF DESCRIPTION OF THE DRAWINGS

FIG. 2 describes another version of a typical configuration for the current generating apparatus.

FIG. 3 describes a metal ribbon coil electrode useful in the present invention.

DETAILED DESCRIPTION OF THE PREFERRED EMBODIMENT

Figure 1:
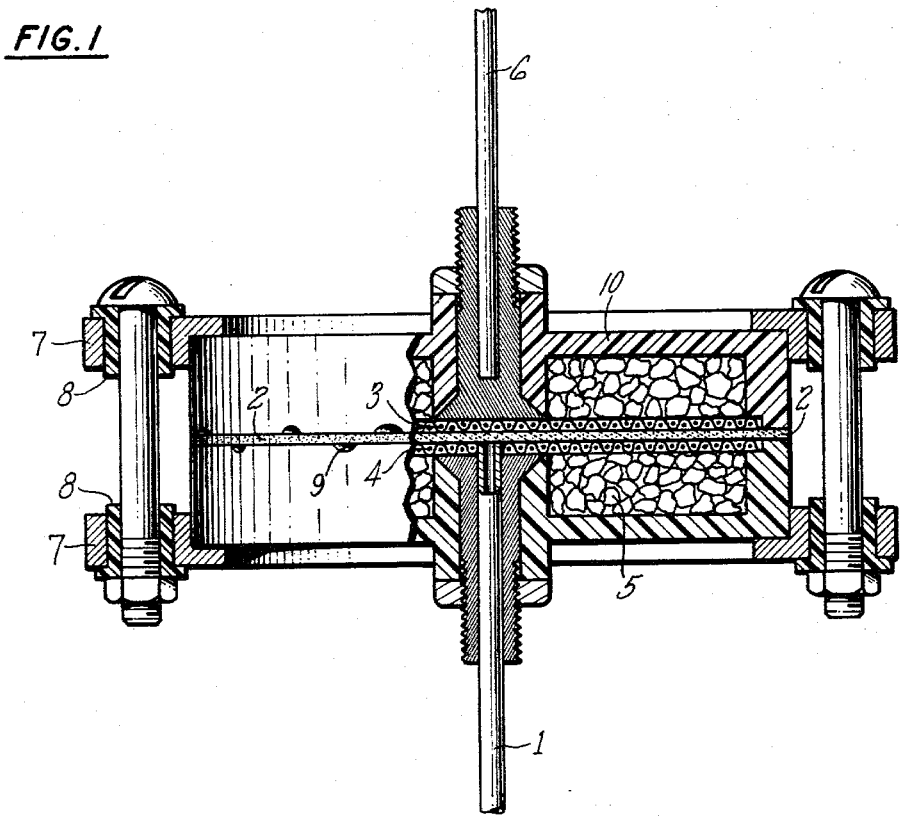
FIG. 1 describes a typical apparatus for performing the claimed method.

Reactions involving the dissociation of ionically conductive fuels such as hydrazine based fuels are capable of generating large potential differences between two electrodes, for example, more than 2.5 and preferably more than 5 volts if the dissociation reactions are suitably controlled. Such reactions can be controlled to provide both high voltages and a steady supply of current.

According to the present invention, ionically conductive fuel dissociation reactions and preferably hydrazine based dissociation reactions can be made to take place on electrode surfaces at high temperatures, for example, from 700° F. to 2000° F., producing voltages in excess of 2.5 volts and preferably in excess of 5 volts, a steady current flow, and a high power/high energy density of over 100 watt-hours.

The key to the selection of the fuel energy source is that it be ionically conductive and produce significant potential differences between two electrodes under high temperature decomposition conditions. Hydrazine based compositions meet this requirement. Typical hydrazine based fuels capable of generating these significant potential differences between two electrodes are hydrazine-salt mixtures such as 77% hydrazine and 23% hydrazine azide, 98% hydrazine and 2% ammonium nitrate, and 98% hydrazine and 2% hydrazine azide. Again, the key is that the fuel source be ionically conductive.

Any catalyst which assists in the decomposition of hydrazine based fuels can be used such as Shell 405 ® (iridium on alumina particles, Shell Chemical Co.) and ruthenium based catalysts such as those disclosed in U.S. Pat. No. 3,970,588.

The porous membrane which will be used to disperse the hydrazine based fuel to the electrodes and catalyst are non-conducting, porous, high temperature stable materials preferably in thin wafer or cloth-type form such as zirconia, alumina, ceramic material such as Fiberfrax ® (Carborundum) and refractory silica such as Refrasil ® (Hitco Co.). The porous membrane also serves as an electrically non-conducting spacer separating the two electrodes.

The electrodes are preferably dissimilar metals with fluid passages (e.g. screens or granular beds) to allow fluid passage of the hydrazine based fuel to the decomposition catalyst. The metals are dissimilar to induce different fuel dissociation reactions (note the equations, infra) and induce current flow in a desired direction. As the hydrazine oxidizing electrode metals such as steel, iron, nickel, cobalt, niobium, molybdenum, tin, tungsten, copper, silver and alloys thereof may be used. As the hydrazine based fuel reducing electrode metals such as magnesium, yttrium, lanthanum, aluminum, beryllium and alloys thereof may be used.

The fuel is supplied through a capillary tube to the porous membrane in controlled amounts and impinges on and is dispersed axially through the porous membrane. Stainless steel and Inconel 800 are particularly suitable materials for the tube. While separate electrical leads such as copper or steel can be connected to the electrodes to provide for current flow, the capillary tube can be electrically conductive and serve as an electrical lead.

In operation the catalyst initiates the decomposition of the ionically conductive fuel producing a potential difference between the electrodes but more importantly heating the electrodes by virtue of heat given off by the dissociation reaction of the fuel. The heated electrodes then cause the subsequent dissociation of the fuel, producing additional heating of the electrode causing further dissociation, etc. Thus, the catalyst is important for starting the dissociation reactions but once begun the heated electrodes become the primary, and in most cases, sole dissociating surface. For this reason it is preferred to have the fuel source contact the catalyst through the electrode, i.e., pass over the electrode surface prior to contacting the catalyst surface.

The fuel flow rate is also controlled so as to maintain the fuel in the apparatus just prior to its dissociation in a heated state for more rapid dissociation, but below its critical temperature. If the fuel is not flowed to the heated electrodes at the proper rate the electrodes could heat at such a rate so as to heat the fuel in the porous membrane, for example, prior to reaching the electrodes at temperatures in excess of its critical temperature resulting in the fuel no longer remaining in liquid state and causing countless problems. For the hydrazine based fuels this temperature is about 716° F. The critical temperature is the maximum temperature the fuel remains in liquid form, regardless of the pressure.

Now referring to the drawings: in FIG. 1, shown partly in section and partly broken away, the hydrazine based fuel is introduced from a pressurized reservoir at controlled amounts through capillary tube 1, (also serving as an electrical lead in this figure) to porous membrane 2. Porous membrane 2 disperses the hydrazine based fuel through electrode screens 3 and 4 where it contacts decomposition catalyst 5. Upon decomposition, high temperatures are generated, for example in excess of 2000° F., causing the rapid dissociation of the hydrazine based fuel heating electrodes 3 and 4 causing continuous dissociation at the electrodes to enable significant amounts of the electrical current to be generated to make the system useful as a current generator. However, the flow of the hydrazine based fuel is controlled so as to limit the temperature of the hydrazine based fuel in the porous membrane to below about 700° F. which is the critical temperature for most hydrazine based fuels, e.g. flow rates of $2 \times 10^{-4}$ lb/sec across a 0.0123 inch$^2$ electrode surface area are acceptable. Electrical lead 6 connected to electrode 3 completes the electrical circuit to obtain the electrical current from the reactive system. In this exemplary apparatus, catalysts, electrodes, and membrane are contained in casing 10 of Inconel 800 or stainless steel. The halves are electrically insulated from one another by the non-conducting porous membrane 2 and ceramic insert 8 and held together by clamps 7, also of insulating (such as ceramic) material. Openings 9 in the casing at the periphery of the electrodes allow for exhaust of various hot, gaseous decomposition products produced when the hydrazine based fuels are dissociated, such as nitrogen, hydrogen and ammonia.

The unbroken portion of FIG. 1 illustrates a typical exterior of the case 10. Casing 10 can be metal or ceramic material provided with openings 9 for exhaust of the dissociation products. Since local temperatures in the order of 2,000° F. are generated in operation, materials stable at these temperatures should be used for most of the components of the apparatus. An exception to this is in the porous membrane where the temperature would be limited to the critical temperature of the fuel source, for example, 716° F. for hydrazine. By appropriately sizing the serrations 9 in FIG. 1, in conjunction with regulation of the hydrazine based fuel flow rate, many combinations of internal operating pressures and temperatures can be selected. The higher the pressure developed, the higher the fuel operating temperature which can be sustained between the electrodes without formation of fuel vapor pockets in the apparatus, being limited by the critical temperature of the ionically conductive and preferably hydrazine based fuel. Self pressurization for maximum temperature operation is beneficial in enhancing the ionic transport as well as increasing overall dissociation rates. Operation at atmospheric pressure would limit the liquid operating temperature to about 236° F., the normal boiling point of hydrazine. Internal apparatus pressures of up to 200 psi are preferred, with 100 to 200 psi most preferred.

FIG. 2 demonstrates an embodiment of the invention employing a simple Swagelok ® (Crawford Fitting Co.) fitting. The capillary 11 supplying the hydrazine based fuel has a coil of magnesium ribbon 12 at its tip (shown in FIG. 3 for clarity) which also serves as the primary electrode, the spaces in the coil providing the necessary porosity for fuel flow. The second electrode, a stainless steel screen 13 is separated from the first electrode by a thin packing of ceramic fibers 14. The decomposition catalyst is Shell 405 catalyst which in this particular embodiment is downstream of the steel screen adjacent a small orifice about 0.060 inch which serves to exhaust the decomposition gases. The orifice is indicated as 15 and the catalyst bed as 16. Insulation seals such as epoxy resin are indicated as 17 and alumina insulation as 18. In this particular example, when the hydrazine based fuel was slowly introduced through the capillary 11 wetting of the ceramic fibers was noted by an abrupt establishment of a potential difference of about 0.5 volt between the two electrodes. Practically no current was detected on an ammeter. However, as the introduction of the hydrazine based fuel continued and decomposition was noted on the catalyst as evidenced by a soft hissing sound, substantial increase in temperature of the Swagelok union was noted (between 150°–180° F.), cell voltage rose to 1.55 volts and the current indicated a sustained reading of about 6 milliamps. When the flow of hydrazine was interrupted the voltage and current fell almost immediately.

While there are many possible half cell reactions that may take place with a hydrazine-hydrazine azide system, two exemplary reactions are as follows:

1.

Anode: $N_3^- = 3/2 N_2 + 1e^-$
Cathode: $N_2H_4.H^+ + 1e^- = N_2H_4 + \tfrac{1}{2}H_2$
Overall Reaction:
$N_2H_4.H^+ + N_3^- = N_2H_4 + 3/2 N_2 + \tfrac{1}{2}H_2$
$\Delta F.° = -64$ kcal/mole; $E° + 2.77$ volts; where $\Delta F.°$ is the change in free energy for the overall reaction and $E°$ the theoretical cell voltage produced.

2.

Anode: $N_3^- = 3/2 N_2 + 1e^{31}$
Cathode: $N_2H_4.H^+ + 1e^- = NH_3 + \tfrac{1}{2}N_2H_4$
Overall Reaction:
$N_3^- + N_2H_4.H^+ = 3/2 N_2 + NH_3 + \tfrac{1}{2}N_2H_4$
$\Delta F° = -84.9$; $E° = 3.67$ volts; where $\Delta F°$ and $E°$ are defined as above.

The devices as shown in the figures are for illustration purposes only. Many modifications are possible. A single adjustable orifice for venting exhaust gases is possible allowing more ready adjustments of internal pressure and propellant flow rate for optimum energy output. The second electrical lead (indicated as 6 in FIG. 1) may be replaced with a second capillary feed tube permitting the simultaneous introduction of more of the same hydrazine based fuel or a different hydrazine based fuel or an independent reactant liquid or gas to the opposite electrode. Similarly, the orifice for the outlet gases might take the form of an exhaust nozzle so that the current generating apparatus could serve simultaneously as a mini-thruster. And, of course, as mentioned above, many combinations and forms of electrode material such as screens, granular beds, etc., may be used. Similarly, a variety of hydrazine based fuels can be used either alone or in admixture, and various additives can be included in the fuel composition to improve conductivity or reaction rates. Also, catalysts might be used in one half of the cell only, to help enforce different reactions at different electrodes.

Accordingly, what has been invented is a high temperature electrical current generating device instantaneously self-activating on command through the use of catalytically and thermally induced decomposition of electrolyte to develop in situ at electrochemical reaction sites on one or both electrodes very high temperatures and at the same time sustain a high overall current producing apparatus temperature.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. Apparatus particularly adapted for hydrazine based fuel dissociation or decomposition type electrical current generation comprising an enclosed chamber containing a porous membrane separating at least two fluid permeable electrodes of dissimilar metal, fuel decomposition catalyst in contact with at least one of said electrodes on that side of the electrode opposite the porous membrane, at least one fuel source inlet to said porous membrane and at least one dissociation product outlet from said porous membrane.

2. The apparatus of claim 1 including electrical leads extending from the electrodes.

3. The apparatus of claim 1 wherein the membrane, electrodes and catalyst are contained in an enclosure having gas vents for exhausting fuel decomposition products.

4. The apparatus of claim 1 wherein the electrodes are metal screens or granular metal beds.

5. The apparatus of claim 1 wherein the fuel source conduit is a hollow metal tube which also serves as an electrical lead.

6. The apparatus of claim 1 wherein the porous membrane is refractory silica, zirconia or alumina.

7. The apparatus of claim 6 wherein the porous membrane is ceramic fibers.

8. The apparatus of claim 1 wherein the catalyst is iridium on an alumina substrate.

9. The apparatus of claim 1 wherein one metal is steel, iron, nickel, cobalt, niobium, molybdenum, tin, tungsten, copper, silver or alloys thereof, and the other metal is magnesium, yttrium, lanthanum, aluminum, beryllium or alloys thereof.

10. A hydrazine based fuel-dissociation type electrical current generating apparatus comprising a metal capillary tube impinging and axially dispersed into a porous membrane of ceramic fibers contacting and enclosed by two metal electrodes of dissimilar metals having fluid passages, a fuel decomposition catalyst comprising iridium coated alumina contacting the porous membrane on at least one side through the fluid passages in at least one of the metal electrodes, an electrical lead extending from one metal electrode, the capillary tube also serving as the other electrical lead, the membrane, electrodes and catalyst contained in an enclosure having gas vents for exhausting fuel-decomposition products.

11. The apparatus of claim 10 wherein one electrode is stainless steel and the other magnesium.

12. A method of generating electrical current comprising catalytically inducing decomposition of an ionically conductive hydrazine based fuel between electrode surfaces of dissimilar metals causing heating of the electrode surfaces sufficient to sustain continued decomposition of the fuel, thereby producing a potential difference between the electrode surfaces and a steady flow of current, the rate of flow of the fuel and the internal pressure controlled so as to maintain ionically conductive hydrazine based fuel in a liquid state between the electrode surfaces for ionic transport.

13. The method of claim 12 wherein one metal is selected from the group consisting of steel, iron, nickel, cobalt, niobium, molybdenum, tin, tungsten, copper, silver and alloys thereof, and the other metal is selected from the group consisting of magnesium, yttrium, lanthanum, aluminum, beryllium and alloys thereof.

14. The process of claim 12 wherein the fuel is a hydrazine-salt mixture.

15. The process of claim 12 wherein the fuel is selected from the group consisting of a mixture of hydrazine and hydrazine azide, a mixture of hydrazine and ammonium nitrate, and mixtures thereof.

16. The process of claim 12 wherein the fuel is a mixture of 77% hydrazine and 23% hydrazine azide by weight.

17. The process of claim 12 wherein the catalytically induced decomposition of the fuel is caused by contact of the fuel with iridium on an alumina substrate.

18. The process of claim 12 wherein the electrode surfaces are heated to about 2000° F.

19. The process of claim 12 wherein the fuel is heated up to its critical temperature prior to continued decomposition.

20. The process of claim 12 wherein the decomposition takes place at pressures of up to about 200 psi.

21. The process of claim 12 wherein the decomposition takes place at pressures of about 100 to 200 psi.

22. The process of claim 12 wherein the fuel is dispersed through a porous membrane just prior to decomposition.

23. The method of claim 22 wherein the porous membrane is refractory silica, zirconia or alumina.

24. The method of claim 22 wherein the porous membrane is ceramic fibers.

25. The process of claim 12 wherein the potential difference produced is greater than 2.5 volts.

26. A method of generating electrical current comprising introducing a fuel mixture of 77% hydrazine and 23% hydrazine-azide by weight through a porous refractory silica or ceramic membrane to stainless steel and magnesium electrodes on opposite sides of the porous membrane, at least one of the electrodes in contact with an iridium catalyst coated alumina substrate which catalyst initiates decomposition of the hydrazine-hydrazine azide mixture causing the heating of the electrodes producing further decomposition and a constant potential difference between the electrodes of at least 5 volts, the rate of flow of the fuel mixture and the internal pressure controlled so as to maintain the fuel mixture in the liquid state between the electrode surfaces for ionic transport.

27. The method of claim 26 wherein the heating produced by the decomposition also heats the hydrazine-hydrazine azide to a temperature up to its critical temperature just prior to its decomposition.

* * * * *